United States Patent
Pever et al.

(10) Patent No.: US 12,009,651 B2
(45) Date of Patent: Jun. 11, 2024

(54) ATMOSPHERIC VENT SYSTEM FOR A BUSWAY ENCLOSURE OF AN OUTDOOR BUSWAY SYSTEM

(71) Applicant: Siemens Industry, Inc., Alpharetta, GA (US)

(72) Inventors: Steven E. Pever, Simpsonville, SC (US); Timothy J. J. Fink, Woodruff, SC (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 17/650,466

(22) Filed: Feb. 9, 2022

(65) Prior Publication Data
US 2024/0063623 A1    Feb. 22, 2024

(51) Int. Cl.
    *H02G 5/04*    (2006.01)
(52) U.S. Cl.
    CPC .................................. *H02G 5/04* (2013.01)
(58) Field of Classification Search
    CPC ....................................................... H02G 5/04
    See application file for complete search history.

(56) References Cited

U.S. PATENT DOCUMENTS

| | | | | |
|---|---|---|---|---|
| 5,355,804 | A | * | 10/1994 | Garcia .................... B61C 13/04 105/155 |
| 2023/0133170 | A1 | * | 5/2023 | Cox ......................... H02G 5/10 174/68.2 |
| 2023/0238647 | A1 | * | 7/2023 | Kuo ....................... H01M 50/30 429/82 |

* cited by examiner

*Primary Examiner* — Pete T Lee

(57) ABSTRACT

An outdoor busway system includes one or more conductor sections and one or more electrical connectors such that a conductor section of the outdoor busway system comprises a housing assembly and a conductor set. An atmospheric vent system for a busway enclosure of an outdoor busway system comprises a connector housing assembly of the outdoor busway system. The connector housing assembly comprises first opposed metal side plates bolted together with second opposed metal plates that are aligned perpendicularly at either end of the first opposed metal side plates such that the connector housing assembly forms a connector housing which includes one or more atmospheric vents affixed into either of sides or ends of the connector housing. Each atmospheric vent of the connector housing having an elastomeric body and a spherical weight that is moveably restrained such that an internal wall engages the spherical weight to create a seal.

20 Claims, 5 Drawing Sheets

Section A-A'

Section A-A'

FIG. 8

Provide a connector housing assembly of an outdoor busway system for providing atmospheric venting in a busway enclosure of the outdoor busway system wherein the connector housing assembly comprises first opposed metal side plates bolted together with second opposed metal plates that are aligned perpendicularly at either end of the first opposed metal side plates such that the connector housing assembly forms a connector housing which includes one or more atmospheric vents affixed into either of sides or ends of the connector housing, and wherein each atmospheric vent of the connector housing having an elastomeric body and a spherical weight that is moveably restrained such that an internal wall engages the spherical weight to create a seal

ATMOSPHERIC VENT SYSTEM FOR A BUSWAY ENCLOSURE OF AN OUTDOOR BUSWAY SYSTEM

BACKGROUND

1. Field

Aspects of the present invention generally relate to an atmospheric vent system for a busway enclosure of an outdoor busway system.

2. Description of the Related Art

Busway systems are commonly provided where power distribution is required. Busway enclosures subjected to outdoor environments can experience condensation which may result in an accumulation of liquid potentially detrimental to performance of an electrical system. Means for draining condensates while preventing ingress of moisture in liquid or solid form are needed. Means to maintain the internal pressure of an enclosure equal to the enclosure's ambient atmospheric pressure are also needed. Prior art solutions include various means of sealing using gaskets and draining using holes in selected locations.

Therefore, there is a need for a better busway system for an outdoor application.

SUMMARY

Briefly described, aspects of the present invention relate to an atmospheric vent system for a busway enclosure of an outdoor busway system. This invention seeks to provide a means for draining condensates while preventing ingress of moisture in liquid or solid form and providing means to maintain the internal pressure of an enclosure equal to the enclosure's ambient atmospheric pressure. The atmospheric vent system provides a body where features are shaped to retain to and seal with a hole of a housing's panel and further having a moveable spherical weight permanently housed within the body. Alignment in vertically upright or inverted orientations cause the atmospheric vent system to seal or drain as gravity acts to move the moveable spherical weight within the body. The moveable spherical weight is determined to seat with an internal wall preventing ingress or alternately expose openings in the body's external walls where condensate or pressurized air can escape.

In accordance with one illustrative embodiment of the present invention, an atmospheric vent system for a busway enclosure of an outdoor busway system is provided. The outdoor busway system comprises a connector housing assembly of the outdoor busway system. The connector housing assembly comprises first opposed metal side plates bolted together with second opposed metal plates that are aligned perpendicularly at either end of the first opposed metal side plates such that the connector housing assembly forms a connector housing which includes one or more atmospheric vents affixed into either of sides or ends of the connector housing. Each atmospheric vent of the connector housing having an elastomeric body and a spherical weight that is moveably restrained such that an internal wall engages the spherical weight to create a seal.

In accordance with one illustrative embodiment of the present invention, a method of providing atmospheric venting in a busway enclosure of an outdoor busway system is provided. The method comprises providing a connector housing assembly of the outdoor busway system. The connector housing assembly comprises first opposed metal side plates bolted together with second opposed metal plates that are aligned perpendicularly at either end of the first opposed metal side plates such that the connector housing assembly forms a connector housing which includes one or more atmospheric vents affixed into either of sides or ends of the connector housing. Each atmospheric vent of the connector housing having an elastomeric body and a spherical weight that is moveably restrained such that an internal wall engages the spherical weight to create a seal.

BRIEF DESCRIPTION OF THE DRAWINGS

FIG. 8 illustrates a schematic view of a flow chart of a method of providing atmospheric venting in a busway enclosure of an outdoor busway system in accordance with an exemplary embodiment of the present invention.

DETAILED DESCRIPTION

Figure 1:
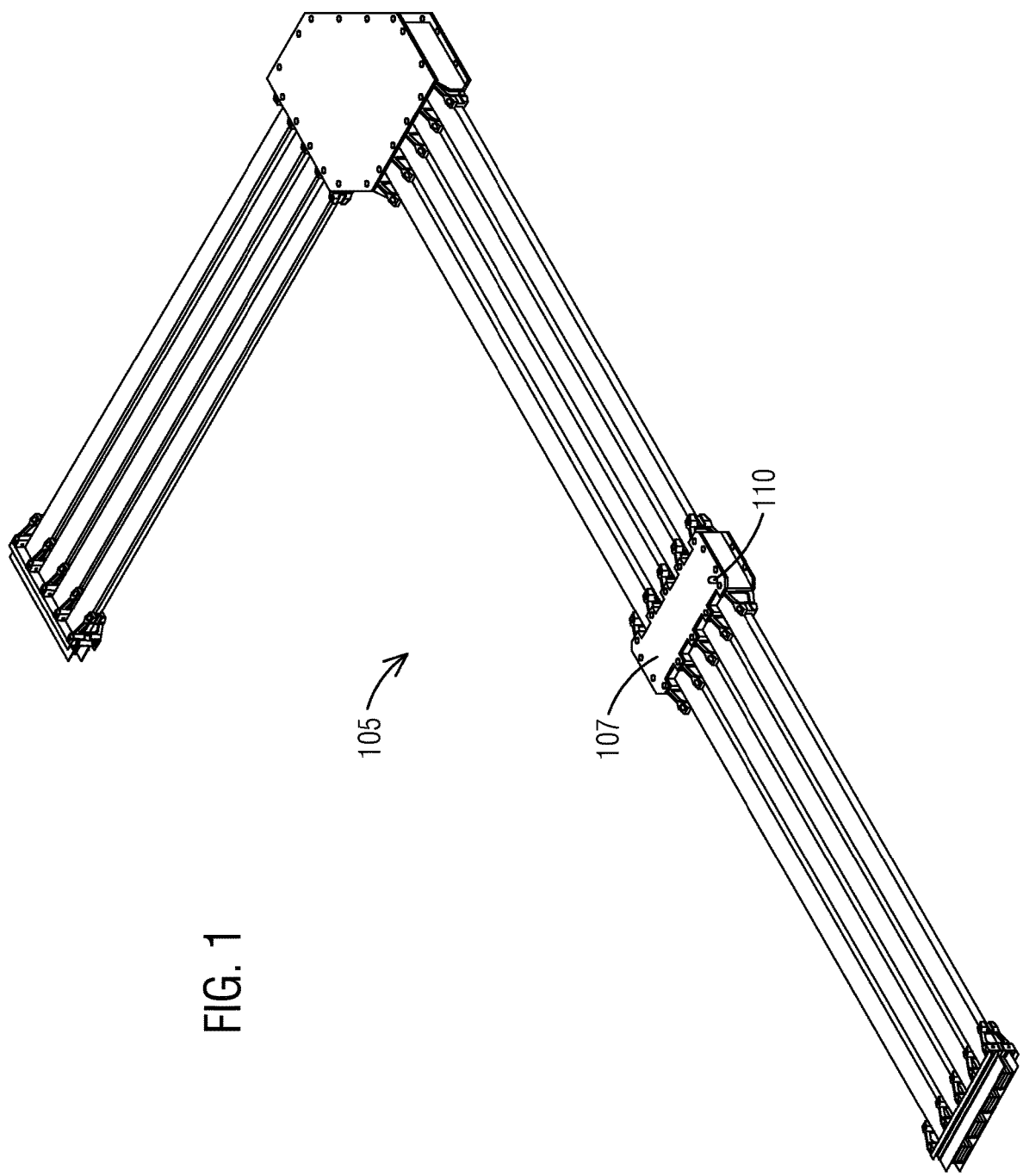
FIG. 1 illustrates an outdoor busway system with a busway enclosure to have an atmospheric vent system built-in in it in accordance with an exemplary embodiment of the present invention.

To facilitate an understanding of embodiments, principles, and features of the present invention, they are explained hereinafter with reference to implementation in illustrative embodiments. In particular, they are described in the context of a means for controlling moisture ingress and releasing condensate within a busways electrical enclosure. This invention employs a moveable weighted sphere which operates with gravity to alternately seal against a surface preventing ingress or otherwise release from sealing releasing condensate. Additional features of this invention are its ability to be self retaining and self sealing with an enclosure's housing. It has a gravity operated seal or release. It contains a weighted sphere. It has features to seal with a weighted sphere. It has features that seal and retain with an enclosure's housing. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the outdoor busway system according to the present disclosure are described below with reference to FIGS. 1-8 herein. Like reference numerals used in the drawings identify similar or identical elements throughout the several views. The drawings are not necessarily drawn to scale.

Consistent with one embodiment of the present invention, FIG. 1 represents an outdoor busway system 105 with a busway enclosure 107 to have an atmospheric vent system 110 built-in in it in accordance with an exemplary embodiment of the present invention. The atmospheric vent system 110 provides a means for draining condensates while preventing ingress of moisture in liquid or solid form and providing means to maintain the internal pressure of an enclosure equal to the enclosure's ambient atmospheric pressure. The atmospheric vent system 110 provides a body where features are shaped to retain to and seal with a hole of a housing's panel and further having a moveable spherical weight permanently housed within the body. Alignment in vertically upright or inverted orientations cause the atmospheric vent system 110 to seal or drain as gravity acts to move the moveable spherical weight within the body. The moveable spherical weight is determined to seat with an internal wall preventing ingress or alternately expose openings in the body's external walls where condensate or pressurized air can escape. The atmospheric vent system 110 provides a means for controlling moisture ingress and releasing condensate within a busways electrical enclosure. The atmospheric vent system 110 employs a moveable weighted sphere which operates with gravity to alternately seal against a surface preventing ingress or otherwise release from sealing releasing condensate. Additional features of the atmospheric vent system 110 are its ability to be self retaining and self sealing with an enclosure's housing. It has a gravity operated seal or release. It contains a weighted sphere. It has features to seal with a weighted sphere. It has features that seal and retain with an enclosure's housing.

Figure 2:
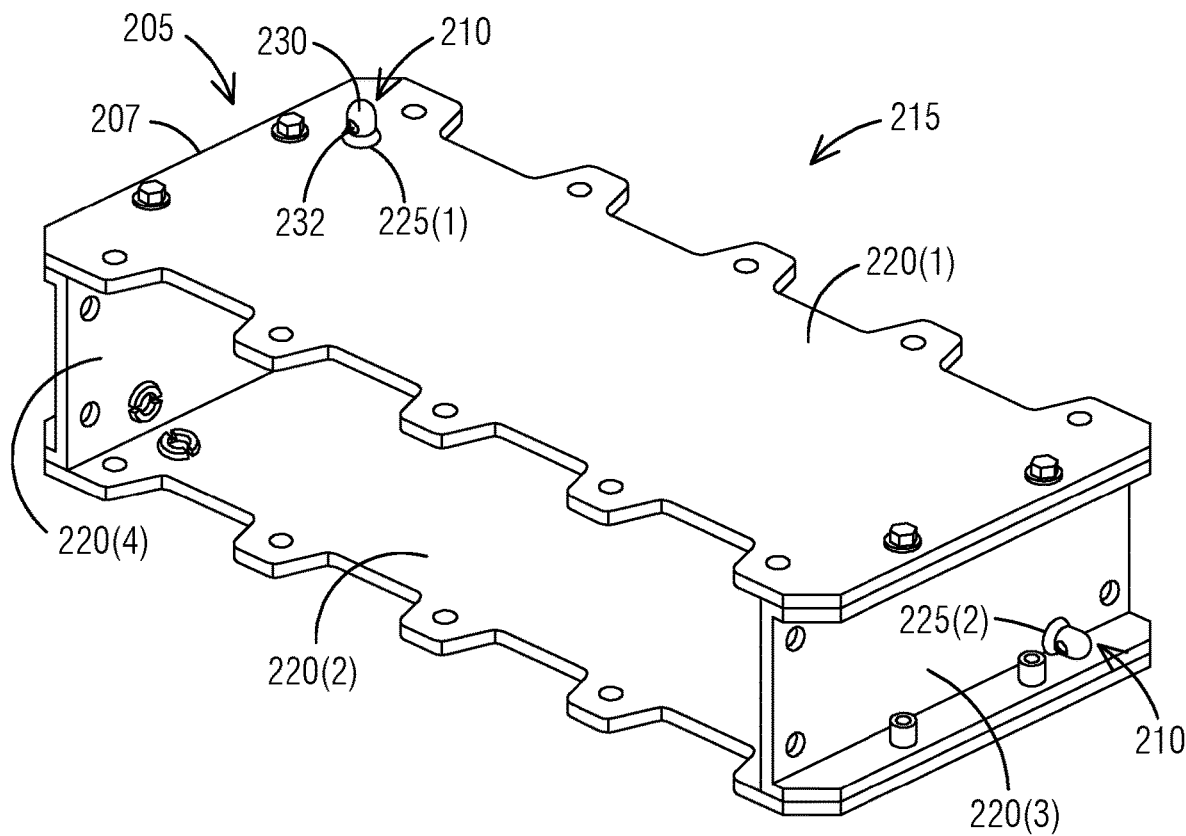
FIG. 2 illustrates an isometric view of a connector housing assembly of a busway enclosure with an atmospheric vent system built-in in it in accordance with an exemplary embodiment of the present invention.

Referring to FIG. 2, it illustrates an isometric view of a connector housing assembly 205 of a busway enclosure 207 with an atmospheric vent system 210 built-in in it in accordance with an exemplary embodiment of the present invention. The atmospheric vent system 210 is provided for the busway enclosure 207 of an outdoor busway system 215. The outdoor busway system 215 comprises the connector housing assembly 205.

The connector housing assembly 205 comprises first opposed metal side plates 220(1-2) bolted together with second opposed metal plates 220(3-4) that are aligned perpendicularly at either end of the first opposed metal side plates 220(1-2) such that the connector housing assembly 205 forms a connector housing which includes one or more atmospheric vents 225(1, 2) affixed into either of sides or ends of the connector housing. Each atmospheric vent 225 of the connector housing having an elastomeric body 230 and a spherical weight 232 that is moveably restrained such that an internal wall engages the spherical weight to create a seal.

Figure 3:
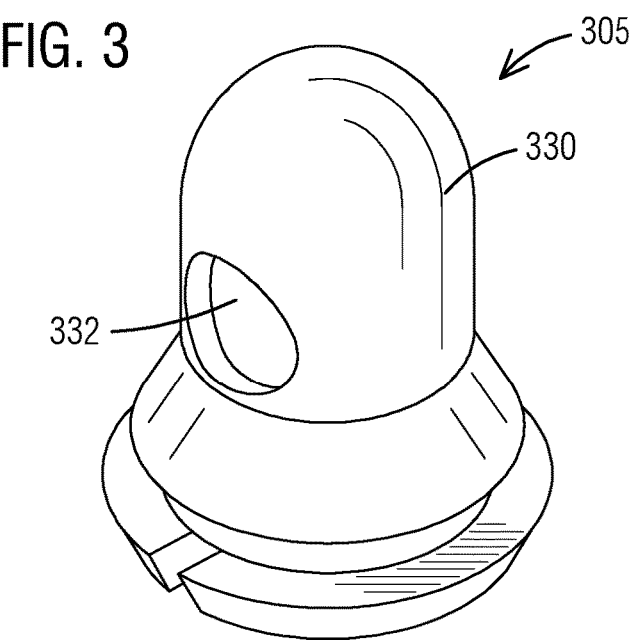
FIG. 3 illustrates an assembly of an atmospheric vent which includes an elastomeric body where a spherical weight is moveably restrained in accordance with an exemplary embodiment of the present invention.

Turning now to FIG. 3, it illustrates an assembly of an atmospheric vent 305 which includes an elastomeric body 330 where a spherical weight 332 is moveably restrained in accordance with an exemplary embodiment of the present invention.

Figure 4:
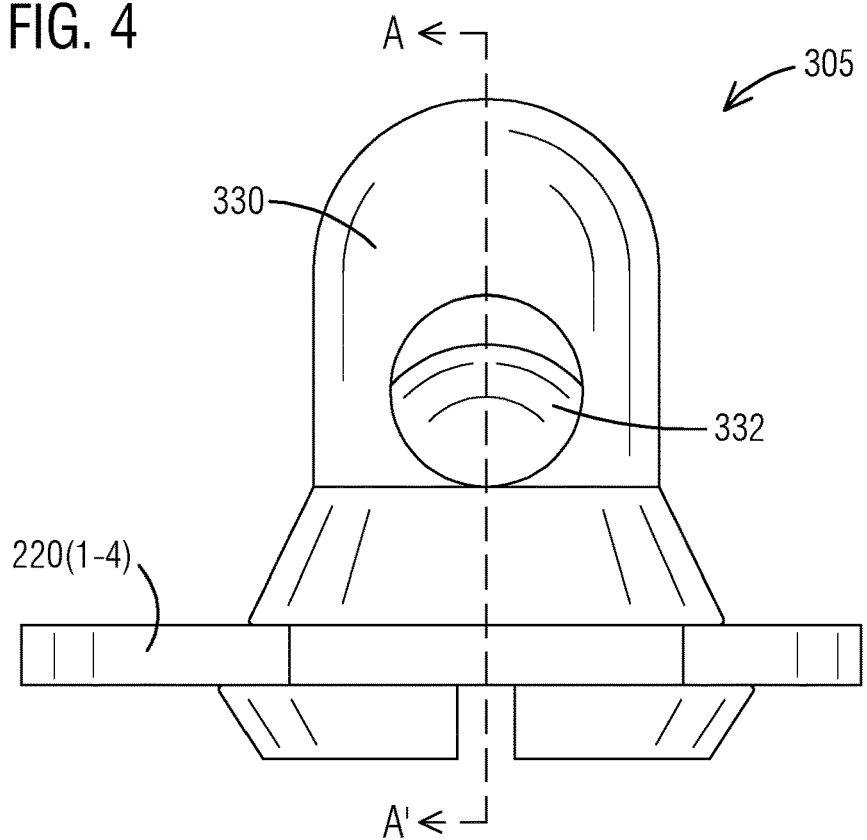
FIG. 4 illustrates the atmospheric vent being fixedly sealed in a housing's side or an end and oriented in an upright position where force of gravity causes the spherical weight to close in accordance with an exemplary embodiment of the present invention.

FIG. 4 illustrates the atmospheric vent 305 being fixedly sealed in a housing's side or an end. Each atmospheric vent 305 of the one or more atmospheric vents being fixedly sealed in a housings side of the first opposed metal side plates 220(1-2) or an end of the second opposed metal plates 220(3-4) and oriented in an upright position where a force of gravity causes the spherical weight 332 to close.

Figure 5:
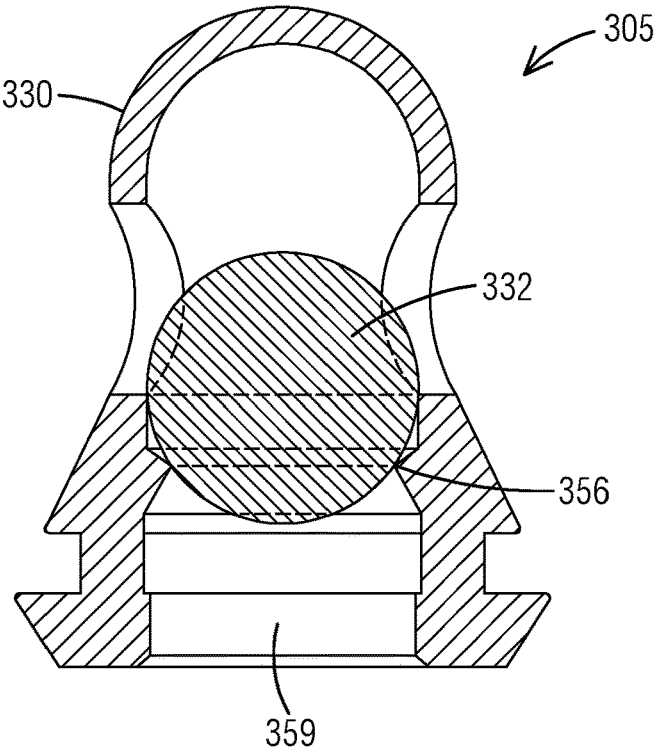
FIG. 5 illustrates a cross-sectional view of the atmospheric vent illustrating the elastomeric body where a circumference of the spherical weight is in an intimate contact about a diameter of a feature and preventing a passage through an opening in accordance with an exemplary embodiment of the present invention.

As seen in FIG. 5, it illustrates a cross-sectional view of the atmospheric vent 305 illustrating the elastomeric body 330 where a circumference of the spherical weight 332 is in an intimate contact about a diameter of a feature and preventing a passage through an opening. In the elastomeric body 330 a circumference of the spherical weight 332 is in an intimate contact about a diameter of a circumferential inner wall feature 356 thus preventing passage through a first opening 359.

Figure 6:
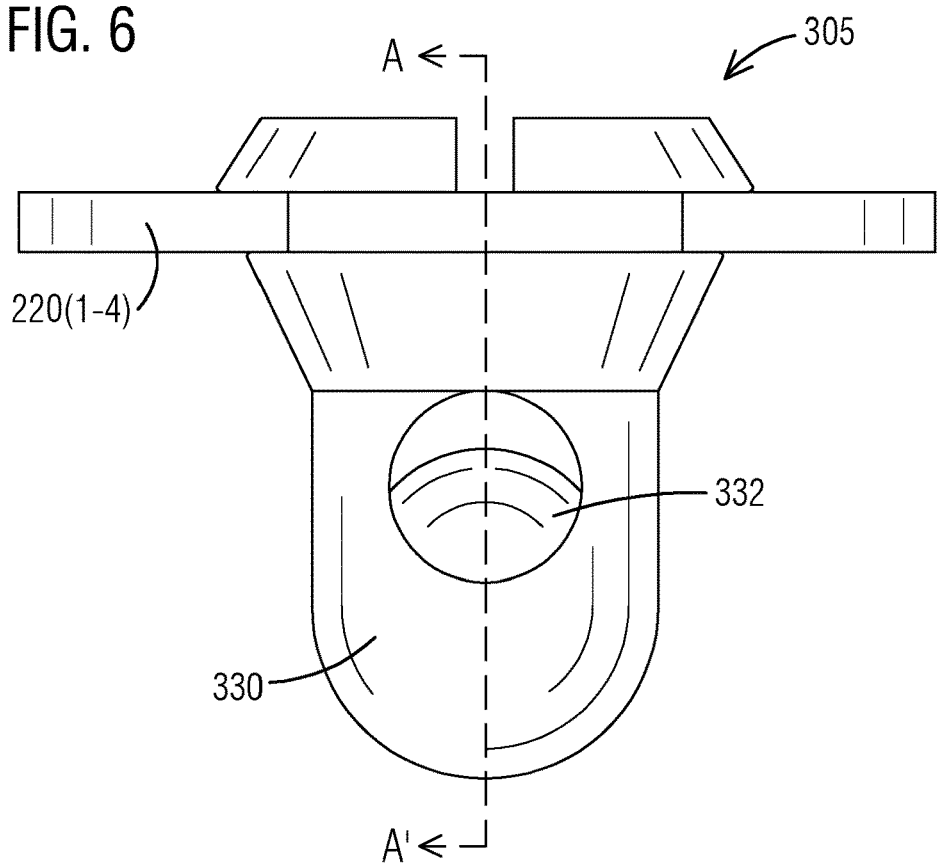
FIG. 6 illustrates the atmospheric vent being fixedly sealed in a housing's side or an end and oriented in an inverted position where a force of gravity causes the spherical weight to open in accordance with an exemplary embodiment of the present invention.

As shown in FIG. 6, it illustrates the atmospheric vent 305 being fixedly sealed in a housing's side or an end and oriented in an inverted position where a force of gravity causes the spherical weight 332 to open in accordance with an exemplary embodiment of the present invention. Each atmospheric vent 305 of the one or more atmospheric vents being fixedly sealed in a housings side of the first opposed metal side plates 220(1-2) or an end of the second opposed metal plates 220(3-4) and oriented in an inverted position where a force of gravity causes the spherical weight 332 to open.

A shape of each atmospheric vent of the one or more atmospheric vents is determined in order to attach and seal with a panel of an enclosure housing. A determined orientation of each atmospheric vent of the one or more atmospheric vents is configured to: prevent movement through a passage, allow movement through a passage, and prevent passage while an atmospheric pressure exceeding that of its environment is released.

Figure 7:
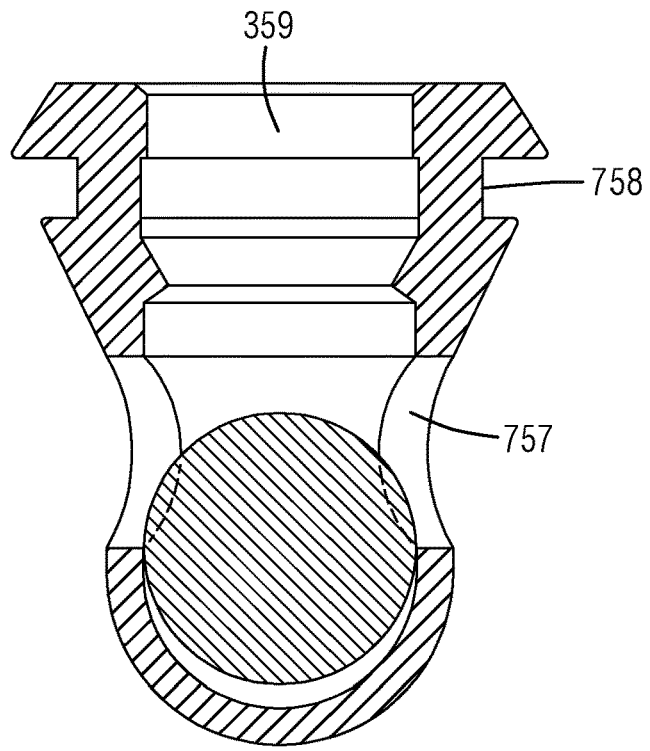
FIG. 7 illustrates a cross-sectional view of the atmospheric vent illustrating the elastomeric body where the spherical weight is disposed downwardly exposing openings and allowing passage through the opening in accordance with an exemplary embodiment of the present invention.

In FIG. 7, it illustrates a cross-sectional view of the atmospheric vent 305 illustrating the elastomeric body 330 where the spherical weight 332 is disposed downwardly exposing openings and allowing passage through the opening in accordance with an exemplary embodiment of the present invention. In particular, in the elastomeric body 330 the spherical weight 332 is disposed downwardly exposing second openings and allowing passage through the first opening 359. The elastomeric body 330 comprises a molded low durometer elastomer having a blunt end shape and having an external channel 758 about its circumference and further having a through hole 757 disposed between the blunt end shape and the external channel 758. The elastomeric body 330 further comprises an internal shape that is largely void and having a diameter determined to exceed a diameter of the spherical weight 332 and where the circumferential inner wall feature 356 is angled to receive the spherical weight 332 and disposed between the external channel 758 and the through hole 757. The spherical weight 332 comprises a non-corrosive metal or polymer where an outer spherical surface is essentially smooth and having a weight determined to seal with an angled wall of the circumferential inner wall feature 356 of the elastomeric body 330.

With regards to FIG. 8, it illustrates a schematic view of a flow chart of a method 800 of providing atmospheric venting in a busway enclosure of an outdoor busway system in accordance with an exemplary embodiment of the present invention. Reference is made to the elements and features described in FIGS. 1-7. It should be appreciated that some steps are not required to be performed in any particular order, and that some steps are optional.

The method 800 comprises a step 805 of providing a connector housing assembly of the outdoor busway system for providing atmospheric venting in a busway enclosure of an outdoor busway system. The connector housing assembly comprises first opposed metal side plates bolted together with second opposed metal plates that are aligned perpendicularly at either end of the first opposed metal side plates such that the connector housing assembly forms a connector housing which includes one or more atmospheric vents affixed into either of sides or ends of the connector housing. Each atmospheric vent of the connector housing having an elastomeric body and a spherical weight that is moveably restrained such that an internal wall engages the spherical weight to create a seal.

While a "elongated" construction where an internal wall engages the spherical weight to create a seal is described here a range of one or more other seal-making ways are also contemplated by the present invention. For example, other seal-making ways may be implemented based on one or more features presented above without deviating from the spirit of the present invention.

The techniques described herein can be particularly useful for atmospheric vents affixed into either of sides or ends of the connector housing. While particular embodiments are described in terms of the two locations, the techniques described herein are not limited to such arrangement but can also be used with other arrangements.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An atmospheric vent system for a busway enclosure of an outdoor busway system, the outdoor busway system comprising:
    a connector housing assembly of the outdoor busway system,
    wherein the connector housing assembly comprises first opposed metal side plates bolted together with second opposed metal plates that are aligned perpendicularly at either end of the first opposed metal side plates such that the connector housing assembly forms a connector housing which includes one or more atmospheric vents affixed into either of sides or ends of the connector housing, and
    wherein each atmospheric vent of the connector housing having an elastomeric body and a spherical weight that is moveably restrained such that an internal wall engages the spherical weight to create a seal.

2. The system of claim 1, wherein each atmospheric vent of the one or more atmospheric vents being fixedly sealed in a housings side of the first opposed metal side plates or an end of the second opposed metal plates and oriented in an upright position where a force of gravity causes the spherical weight to close.

3. The system of claim 1, wherein in the elastomeric body a circumference of the spherical weight is in an intimate contact about a diameter of a circumferential inner wall feature thus preventing passage through a first opening.

4. The system of claim 1, wherein each atmospheric vent of the one or more atmospheric vents being fixedly sealed in a housings side of the first opposed metal side plates or an end of the second opposed metal plates and oriented in an inverted position where a force of gravity causes the spherical weight to open.

5. The system of claim 1, wherein in the elastomeric body the spherical weight is disposed downwardly exposing second openings and allowing passage through a first opening.

6. The system of claim 1, wherein the elastomeric body comprises:
    a molded low durometer elastomer having a blunt end shape and having an external channel about its circumference and further having a through hole disposed between the blunt end shape and the external channel.

7. The system of claim 6, wherein the elastomeric body further comprises:
    an internal shape that is largely void and having a diameter determined to exceed a diameter of the spherical weight and where a circumferential inner wall feature is angled to receive the spherical weight and disposed between the external channel and the through hole.

8. The system of claim 7, wherein the spherical weight comprises:
    a non-corrosive metal or polymer where an outer spherical surface is essentially smooth and having a weight determined to seal with an angled wall of the circumferential inner wall feature of the elastomeric body.

9. The system of claim 1, wherein a shape of each atmospheric vent of the one or more atmospheric vents is determined in order to attach and seal with a panel of an enclosure housing.

10. The system of claim 1, wherein a determined orientation of each atmospheric vent of the one or more atmospheric vents is configured to:
    a. prevent movement through a passage
    b. allow movement through a passage,
    c. prevent passage while an atmospheric pressure exceeding that of its environment is released.

11. A method of providing atmospheric venting in a busway enclosure of an outdoor busway system, the method comprising:
    providing a connector housing assembly of the outdoor busway system,
    wherein the connector housing assembly comprises first opposed metal side plates bolted together with second opposed metal plates that are aligned perpendicularly at either end of the first opposed metal side plates such that the connector housing assembly forms a connector housing which includes one or more atmospheric vents affixed into either of sides or ends of the connector housing, and
    wherein each atmospheric vent of the connector housing having an elastomeric body and a spherical weight that is moveably restrained such that an internal wall engages the spherical weight to create a seal.

12. The method of claim 11, wherein each atmospheric vent of the one or more atmospheric vents being fixedly sealed in a housings side of the first opposed metal side plates or an end of the second opposed metal plates and oriented in an upright position where a force of gravity causes the spherical weight to close.

13. The method of claim 11, wherein in the elastomeric body a circumference of the spherical weight is in an intimate contact about a diameter of a circumferential inner wall feature thus preventing passage through a first opening.

14. The method of claim 11, wherein each atmospheric vent of the one or more atmospheric vents being fixedly sealed in a housings side of the first opposed metal side plates or an end of the second opposed metal plates and oriented in an inverted position where a force of gravity causes the spherical weight to open.

15. The method of claim 11, wherein in the elastomeric body the spherical weight is disposed downwardly exposing second openings and allowing passage through a first opening.

16. The method of claim 11, wherein the elastomeric body comprises:
    a molded low durometer elastomer having a blunt end shape and having an external channel about its circumference and further having a through hole disposed between the blunt end shape and the external channel.

17. The method of claim 16, wherein the elastomeric body further comprises:
    an internal shape that is largely void and having a diameter determined to exceed a diameter of the spherical weight and where a circumferential inner wall feature is angled to receive the spherical weight and disposed between the external channel and the through hole.

18. The method of claim 17, wherein the spherical weight comprises:
- a non-corrosive metal or polymer where an outer spherical surface is essentially smooth and having a weight determined to seal with an angled wall of the circumferential inner wall feature of the elastomeric body.

19. The method of claim 11, wherein a shape of each atmospheric vent of the one or more atmospheric vents is determined in order to attach and seal with a panel of an enclosure housing.

20. The method of claim 11, wherein a determined orientation of each atmospheric vent of the one or more atmospheric vents is configured to:
- a. prevent movement through a passage
- b. allow movement through a passage,
- c. prevent passage while an atmospheric pressure exceeding that of its environment is released.

\* \* \* \* \*